(12) United States Patent
Miller

(10) Patent No.: US 8,086,547 B2
(45) Date of Patent: *Dec. 27, 2011

(54) DATA PATTERN GENERATION, MODIFICATION AND MANAGEMENT UTILIZING A SEMANTIC NETWORK-BASED GRAPHICAL INTERFACE

(75) Inventor: Landon C. G. Miller, Tuscaloosa, AL (US)

(73) Assignee: International Business Machines Corporation, Armonk, NY (US)

( * ) Notice: Subject to any disclaimer, the term of this patent is extended or adjusted under 35 U.S.C. 154(b) by 799 days.

This patent is subject to a terminal disclaimer.

(21) Appl. No.: 12/139,743

(22) Filed: Jun. 16, 2008

(65) Prior Publication Data

US 2009/0313187 A1    Dec. 17, 2009

(51) Int. Cl.
*G06F 17/00* (2006.01)
*G06F 17/20* (2006.01)

(52) U.S. Cl. .......................................................... 706/11
(58) Field of Classification Search ...................... 706/11
See application file for complete search history.

(56) References Cited

U.S. PATENT DOCUMENTS

| | | | |
|---|---|---|---|
| 3,971,018 A | 7/1976 | Isbister et al. |
| 3,988,725 A | 10/1976 | Doherty |
| 4,365,238 A | 12/1982 | Kollin |
| 4,622,540 A | 11/1986 | Guscott et al. |
| 4,623,966 A | 11/1986 | O'Sullivan |
| 4,706,090 A | 11/1987 | Hashiguchi et al. |
| 5,161,203 A | 11/1992 | Buckley |
| 5,179,385 A | 1/1993 | O'Loughlin et al. |
| 5,268,690 A | 12/1993 | Shibata |
| 5,432,515 A | 7/1995 | O'Conner |
| 5,495,237 A | 2/1996 | Yuasa et al. |
| 5,566,092 A | 10/1996 | Wang et al. |
| 5,809,499 A | 9/1998 | Wong et al. |
| 5,896,082 A | 4/1999 | MacFarlane |
| 5,940,529 A | 8/1999 | Buckley |
| 6,209,103 B1 | 3/2001 | Schreiber et al. |
| 6,249,241 B1 | 6/2001 | Jordan et al. |
| 6,257,354 B1 | 7/2001 | Schrader et al. |
| RE37,536 E | 2/2002 | Barnes |
| 6,417,797 B1 | 7/2002 | Cousins et al. |
| 6,427,121 B2 | 7/2002 | Brodie |

(Continued)

OTHER PUBLICATIONS

U.S. Appl. No. 11/837,921, Non-Final Office Action Mailed Dec. 29, 2009.

(Continued)

*Primary Examiner* — Michael B Holmes
(74) *Attorney, Agent, or Firm* — John R. Pivnichny; Law Office of Jim Boice

(57) ABSTRACT

A plurality of pattern components is presented to a user. Each of the pattern components describe events and/or sub-events that, when combined, create emergent information that indicates the occurrence of a primary event. The user builds and then transmits a customized graphical event pattern, composed of one or more pattern components, rules and other emergent information artifacts to a server, which generates an underlying database file that describes the customized graphical event pattern and/or data pattern. The data pattern is then transmitted to an intelligent sensor, server, or other detection device. If a set of event data inputs, from an interlinked array of intelligent sensors or other detection devices, meet a predetermined threshold requirement of one or more of the pattern components, the data patterns then intercommunicate and vote as to the degree to which they have collectively each detected a primary event, using the sub-events as criteria.

20 Claims, 15 Drawing Sheets

U.S. PATENT DOCUMENTS

| | | | |
|---|---|---|---|
| 6,437,692 | B1 | 8/2002 | Petite et al. |
| 6,515,586 | B1 | 2/2003 | Wymore |
| 6,735,630 | B1 | 5/2004 | Gelvin et al. |
| 6,903,676 | B1 | 6/2005 | Frady et al. |
| 6,930,596 | B2 | 8/2005 | Kulesz et al. |
| 6,987,459 | B2 | 1/2006 | Tice |
| 7,025,130 | B2 | 4/2006 | Bailey et al. |
| 7,049,998 | B1 | 5/2006 | Frady et al. |
| 7,053,770 | B2 | 5/2006 | Ratiu et al. |
| 7,148,803 | B2 | 12/2006 | Bandy et al. |
| 7,152,027 | B2 | 12/2006 | Andrade et al. |
| 7,271,704 | B2 | 9/2007 | McSheffrey et al. |
| 7,475,428 | B2 | 1/2009 | Smith et al. |
| 7,496,472 | B2 | 2/2009 | Seem |
| 7,528,711 | B2 | 5/2009 | Kates |
| 7,624,448 | B2 | 11/2009 | Coffman |
| 7,693,589 | B2 | 4/2010 | Miller |
| 7,710,257 | B2 | 5/2010 | Miller |
| 7,710,258 | B2 | 5/2010 | Miller |
| 7,710,259 | B2 | 5/2010 | Miller |
| 7,710,260 | B2 | 5/2010 | Miller |
| 7,864,037 | B2 * | 1/2011 | Miller .......................... 340/506 |
| 2003/0171939 | A1 | 9/2003 | Yagesh et al. |
| 2005/0124291 | A1 | 6/2005 | Hart et al. |
| 2005/0271266 | A1 | 12/2005 | Perrier |
| 2005/0275530 | A1 | 12/2005 | Kates |
| 2006/0176169 | A1 | 8/2006 | Doolin et al. |
| 2007/0015548 | A1 | 1/2007 | Flick |
| 2007/0061022 | A1 | 3/2007 | Hoffberg-Borghesani et al. |
| 2007/0096899 | A1 | 5/2007 | Johnson |
| 2007/0097993 | A1 | 5/2007 | Bojahra et al. |
| 2007/0132846 | A1 | 6/2007 | Broad et al. |
| 2007/0167859 | A1 | 7/2007 | Finneran et al. |
| 2007/0209075 | A1 | 9/2007 | Coffman |
| 2007/0250461 | A1 | 10/2007 | Sabe et al. |
| 2008/0094212 | A1 | 4/2008 | Breed |
| 2008/0109091 | A1 | 5/2008 | Joslin et al. |
| 2009/0022548 | A1 | 1/2009 | Bishop et al. |

OTHER PUBLICATIONS

U.S. Appl. No. 11/837,921, Final Office Action Mailed Jul. 8, 2007.
U.S. Appl. No. 11/837,955, Non-Final Office Action Mailed Aug. 17, 2008.
U.S. Appl. No. 11/837,955, Final Office Action Mailed Mar. 5, 2010.
U.S. Appl. No. 11/838,618, Non-Final Office Action Mailed Jun. 22, 2009.
U.S. Appl. No. 11/838,618, Notice of Allowance Mailed Dec. 17, 2009.
U.S. Appl. No. 11/838,656, Non-Final Office Action Mailed Jun. 22, 2009.
U.S. Appl. No. 11/838,656, Notice of Allowance Mailed Dec. 17, 2009.
U.S. Appl. No. 11/838,684, Non-Final Office Action Mailed Jun. 22, 2009.
U.S. Appl. No. 11/838,684, Notice of Allowance Mailed Dec. 21, 2009.
U.S. Appl. No. 11/838,695, Non-Final Office Action Mailed Jun. 22, 2009.
U.S. Appl. No. 11/838,695, Notice of Allowance Mailed Dec. 17, 2009.
U.S. Appl. No. 11/838,729, Non-Final Office Action Mailed May 11, 2009.
U.S. Appl. No. 11/838,729, Notice of Allowance Mailed Nov. 17, 2009.
U.S. Appl. No. 11/838,739, Non-Final Office Action Mailed May 15, 2009.
U.S. Appl. No. 11/838,739, Final Office Action Mailed Nov. 13, 2009.
U.S. Appl. No. 11/838,739, Notice of Allowance Mailed Feb. 26, 2010.
U.S. Appl. No. 11/838,739, Notice of Allowance Mailed Jun. 1, 2010.
U.S. Appl. No. 11/838,769, Notice of Allowance Mailed Jun. 15, 2010.
U.S. Appl. No. 12/139,766, Notice of Allowance Mailed Jul. 10, 2009.
U.S. Appl. No. 11/837,886, Non-Final Office Action Mailed May 27, 2010.
U.S. Appl. No. 11/838,637, Final Office Action Mailed Jun. 16, 2010.
U.S. Appl. No. 11/838,637, Non-Final Office Action Mailed Jan. 20, 2010.
U.S. Appl. No. 12/139,723, Non-Final Office Action Mailed Jun. 16, 2010.
U.S. Appl. No. 12/139,723, Notice of Allowance Mailed Aug. 30, 2010.
U.S. Appl. No. 11/838,637, Notice of Allowance Mailed Oct. 7, 2010.
U.S. Appl. No. 11/837,886, Notice of Allowance Mailed Mar. 3, 2011.

* cited by examiner

DATA PATTERN GENERATION, MODIFICATION AND MANAGEMENT UTILIZING A SEMANTIC NETWORK-BASED GRAPHICAL INTERFACE

BACKGROUND OF THE INVENTION

1. Technical Field

The present disclosure relates to the field of detection networks and managing the emergent information that their sensors develop.

2. Description of the Related Art

Currently, system sensors and other detection processes and devices collect data in a non-intelligent manner. That is, even if a sensor has limited intelligence (e.g., a camera that automatically tracks moving objects), most of the data collected by the sensors, and then transmitted to a controller, is meaningless. Furthermore, sensors typically transmit data in a continuous manner, such that most of the transmitted data is "dead air" in which nothing of interest is happening. To find subject matter of interest, the controller must perform manual data mining that is time consuming, and worse yet, does not enable the controller to recognize emergent information patterns that are obvious only in the context of a composite picture created by data from different sensors.

SUMMARY OF THE INVENTION

A method, system and computer program product for utilizing emergent information is presented. The method begins by presenting a plurality of pattern components to a user. Each of the pattern components describe events and/or sub-events that, when combined, create emergent information that indicates the occurrence of a primary event. The user builds and then transmits a customized graphical event pattern, composed of one or more pattern components, rules and other emergent information artifacts to a server, which generates an underlying database file that describes the customized graphical event pattern or data pattern. The data pattern is then transmitted to an intelligent sensor, server, or other detection device. If a set of event data inputs, from an interlinked array of intelligent sensors or other detection devices, meet a pre-determined threshold requirement of one or more of the pattern components, the data patterns then begin to intercommunicate and vote as to the degree to which they have collectively each detected a primary event, using the sub-events as criteria. When a threshold combination of sub-event detections has occurred across all the instances of the data pattern, a notification signal is sent to the user.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
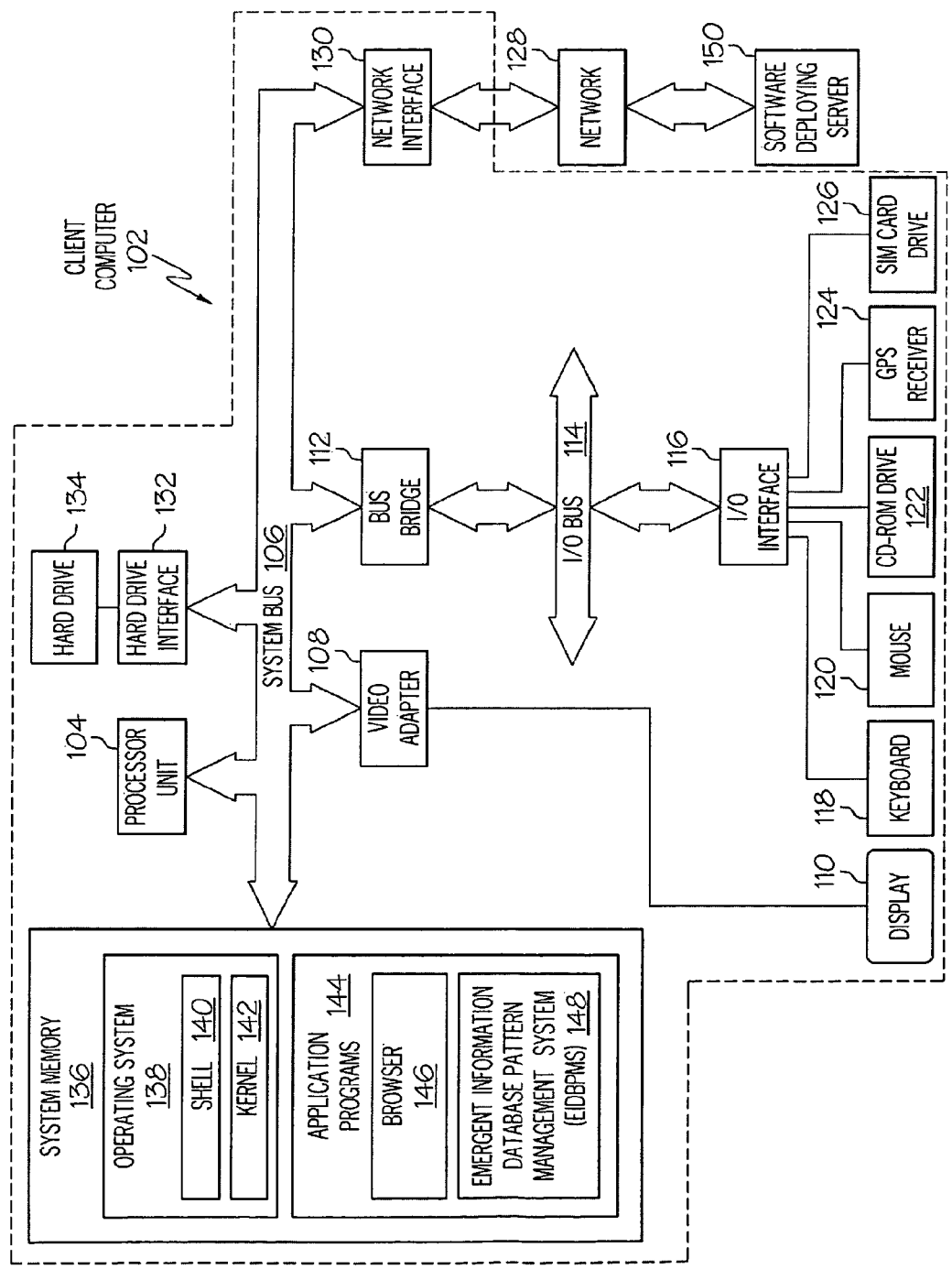
FIG. 1 depicts an exemplary computer architecture that may be utilized to implement the present invention.

Presently presented is a hardware, software and process system for managing emergent information patterns from a sensor network through the use of graphical user-created patterns.

As described in detail below, a field of smart sensors, as used in the present invention, is interactive. A controlling software, which describes a set of search patterns for the field of sensors, is pre-programmed or downloaded to the field of sensors. Each sensor "votes" as to whether it has detected an external stimulus that fits in any of the search patterns stored within the sensor. As the "vote" tally reaches a high enough percentage of "opt-ins," against a time line per pattern, the sensor field takes turns trying to get the results of the vote and its supporting details, already constantly shared amongst the sensors (e.g., by using a ZIGBEE™-type network—ZIGBEE is a registered trademark of the ZigBee Alliance in the United States and other countries), out via various telecommunications channels. Once one sensor gets the message out, the process re-commences.

Multiple information patterns can be searched for at once, since the information patterns are all pre-downloaded, and all can be checked against all the time. These information patterns can be updated and changed, and new information patterns can be added by a local or remote controller.

Reports generated by the output of data from the field of sensors provides pattern details (describing the pattern of sensed data), supporting data (that supports the pattern details), emergent results (next-level information that becomes "apparent" only after the data is received from the field of sensors), and other deterministic realtime information (including diagnostic data regarding the health of each sensor and its lines of communication with other sensors and the controller).

The novel system described herein is extremely valuable when attempting to deal with deterministic realtime problems, including those resulting from circumstances that are more complex than those created by just a single sensor being set off. Furthermore the process and system described herein are valuable to any situation where more than one sensor or type of sensor is needed to develop emergent information (i.e., information needed for a human to recognize a pattern that serves a useful purpose, but which is made of individual data units that produce no useful information when taken alone and individually).

This new system also creates a low power consumption profile for each sensor, since each sensor does not have to report "no op" all the time (i.e., the present invention does not require each sensor to continuously report insignificant non-events). As described herein, each sensor in the field can take turns reporting emergent information for the whole field of sensors. This provides many network paths to get a report out when needed, since each individual sensor can be connected separately (e.g., through a ZIGBEE™-type network) for outbound purposes, and thus one sensor can report for all. This approach also provides for deterministic realtime pattern evaluation, as well as constant addition, deletion, and changes of information patterns to be analyzed by the field of sensors. Furthermore, some of the field sensors can be out and the overall field of sensors can still be successful due to built-in redundancy. In addition, with some patterns, a tentative "yes" vote can automatically occur when a pre-determined quota of "hits" by sensors is reached (e.g., two-thirds of the sensors reporting against a pattern).

This system works by pre-establishing emergent information and its patterns, and then downloading those patterns into smart sensors fields that now analyze each sensor's external data capture to:

1) match against those patterns in deterministic realtime mode;

2) vote as to matches using inter-networking technologies within time lines per pattern;

3) signal out when a sufficient match is established;

4) monitor for sensor health;

5) accept constant downloads of adds, deletes and changes to search patterns; and 6) work in degraded conditions such as sensors out, overloaded communications, and interference.

Pre-Store and Search Data Patterns

As described below, the present invention efficiently describes, categorizes and manages emergent information generated by the sensor network and stored in the Emergent Information Database Management System (EIDBMS). An event pattern is manually created by a user on a Graphical User Interface (GUI) to create a graphical representation of an event. This graphical representation is not unlike a grammatical sentence diagram, in which components are logically linked together to create a "total picture" of the event, thus leading to emergent information. These graphical representations are used to generate data patterns in the EIDBMS, which are stored for future deployment in recognizing and managing events detected by the sensor network by searching new data patterns. Some of the advantages of such data pattern searches include higher accuracy, substantial speed and response time performance, and the ability to implement self-learning systems. Higher accuracy is achieved through only reporting search results that represent fully defined emergent data patterns. A substantial speed improvement comes from the forward placement of the search in the collection stream, and then reporting the results as soon as a data pattern is triggered. Self-learning occurs as the emergent information data patterns are improved through self-analysis, through further combination of accumulated, improving rules, and then the subsequent use of data patterns within data patterns. Eventually, this leads to emergent information that represents accumulated experience, and then wisdom or accumulated pattern "rightness."

As described below, the process begins with a user generating a data pattern using an inventive semantic network driven data pattern generation process. At some point in time, the pattern is then used to create a search in the parallel architecture search process. In one embodiment, each parallel search is enabled by first, the deployment of a Service Oriented Architecture (SOA) service search agent to parallel processors, and then by the deployment of data patterns sent forward from the search SOA service. The search SOA service and the federated agents are all inter-connected via XML messaging schemas that are used for distributing the data patterns, as well as for inter-agent messaging and voting. All of the SOA search agents examine data via various means that include, for example, loading stored procedures in target databases that are resident in the forward deployed computing capabilities that are as far to the edge of the network as possible, and/or processing data at a socket as it comes off of a sensor or from an external system, etc. The SOA search agents each detect some or all of a data pattern, and then message each other and vote. Results are then sent to the search SOA service, and on to other elements of the inventive end-to-end data pattern driven architecture using the XML messaging schemas. Search data patterns are constantly updated, deleted, and added as required.

With reference now to FIG. 1, there is depicted a block diagram of an exemplary computer 102, in which the present invention may be utilized. Note that some or all of the exemplary architecture shown for computer 102 may be utilized by software deploying server 150, as well as server 220, computer 225 and elements 206-216 shown in FIG. 2.

Computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a GPS receiver 124 and a SIM card drive 126 (for use with any of the sensors shown in the array of sensors 202 in FIG. 2). The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet or transit network 218 shown below in FIG. 2, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®, which is a registered trademark of The Open Group in the United States and other countries), also called a command processor in WINDOWS® (WINDOWS is a registered trademark of Microsoft Corporation in the United States and other countries), is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., computer 102) to send and receive network messages to the Internet using Hyper-Text Transfer Protocol (HTTP) messaging, thus enabling communication with software deploying server 150 and other described computer systems.

Application programs 144 in computer 102's system memory (as well as software deploying server 150's system memory) also include an Emergent Information Database Pattern Management System (EIDBPMS) 148. EIDBPMS 148 includes code for implementing the processes described in FIGS. 2-13. In one embodiment, computer 102 is able to download EIDBPMS 148 from software deploying server 150 in an "on-demand" basis. Note further that, in a preferred embodiment of the present invention, software deploying server 150 performs all of the functions associated with the present invention (including execution of EIDBPMS 148), thus freeing computer 102 from having to use its own internal computing resources to execute EIDBPMS 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
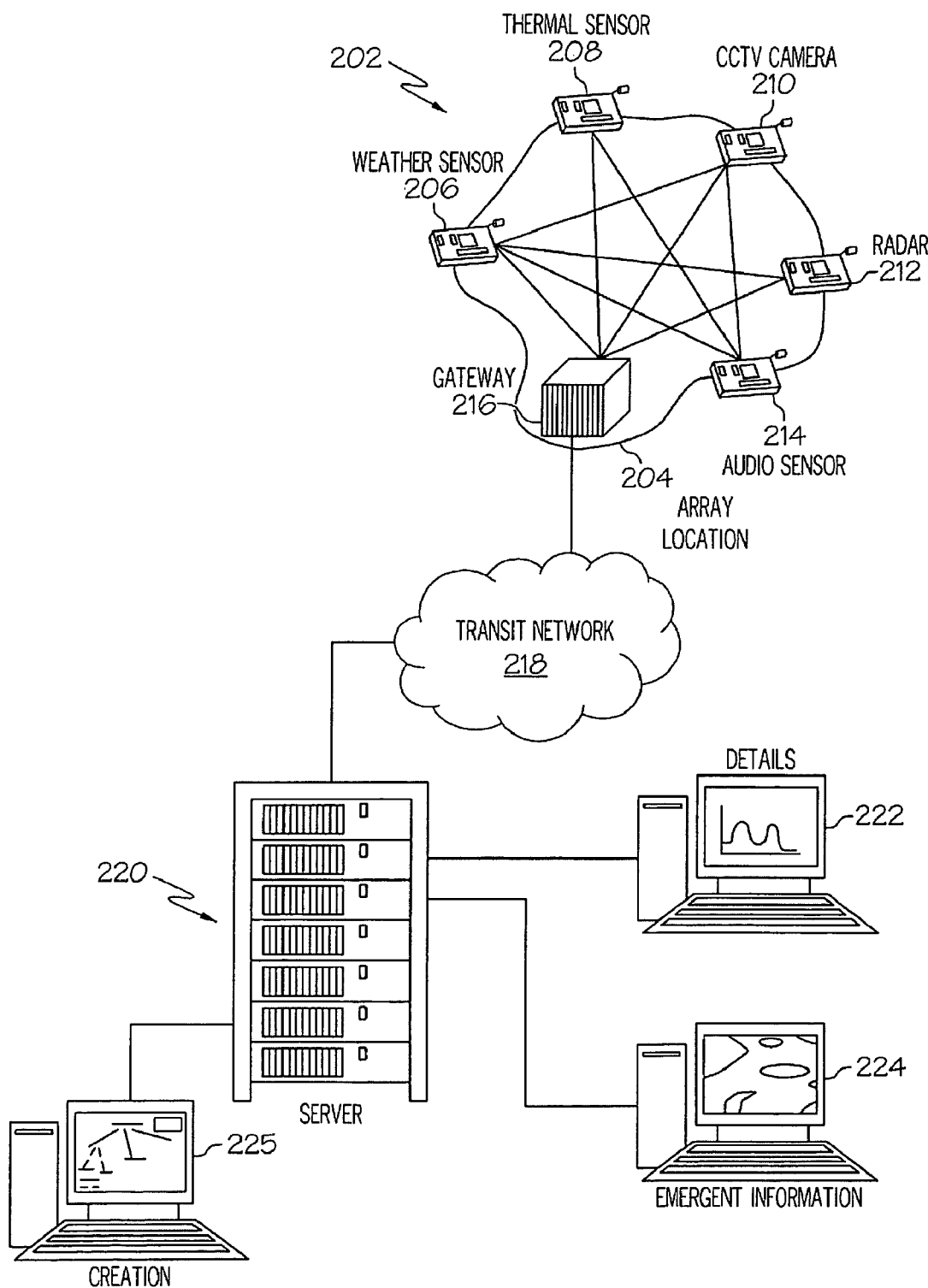
FIG. 2 depicts an exemplary array of sensors used to generate emergent information about a sensor field (sensor location)

With reference now to FIG. 2, an exemplary array of sensors 202 in an array location 204 (sensor field) is depicted. As depicted, the array of sensors 202 is shown in exemplary manner as an interconnected array of intelligent sensors. For exemplary purposes, assume that the array location 204 is a coastline, in which there is a high traffic of maritime smuggling. The array of sensors 202 is pre-programmed with logic to detect suspicious activity. For example, the weather sensor 206 may detect inclement weather (e.g., cloud cover at night to make marine vessel detection difficult); the thermal sensor 208 may detect a thermal image of a marine vessel (e.g., how many engines it has and how many people are on board); a Closed Circuit Television (CCTV) camera 210 can intelligent detect and slave to moving objects on the water; a radar 212 system can detect the speed and movement of larger marine vessels; and an audio sensor 214 (e.g., an underwater hydrophone, an air microphone, etc.) can detect and interpret certain sound patterns for suspicious marine vessels (e.g., high-speed "cigarette" boats favored by drug traffickers). Within each sensor in the array of sensors 202 are programmed trigger rules, relationship rules, and emergent information logic.

A trigger rule is a rule that describes what conditions must be met for a sensor to issue an event signal to the other sensors in the array of sensors 202. For example, weather sensor 206 may have a trigger rule that requires weather sensor 206 to issue an event signal whenever a local rain gauge, barometer and thermometer indicate rainy conditions. Similarly, thermal sensor 208 may have a trigger rule that requires thermal sensor 208 to issue an event signal if the heat signature of only one person is registered in a cigarette boat, whose presence was detected by radar 212. The presence of the cigarette boat was put onto the array of sensors 202 in response to a trigger rule (e.g., speed and path measured by CCTV camera 210 and/or radar 212) being fired in radar 212. Likewise, if audio sensor 214 recognizes an audio signature of a suspicious marine vessel (e.g., a cigarette boat), this causes the trigger rule in the audio sensor 214 to cause the release of an event signal from the audio sensor 214.

Relationship rules are rules that define how sensors should communicate among themselves, and which sensor should communicate with a remote controller, if necessary. As shown in FIG. 2, all sensors are interlocked, such that every sensor communicates with every other sensor in the array of sensors 202. However, in another embodiment, some sensors may communicate with only certain other sensors within the array of sensors 202, or some sensors may communicate with sensors in other sensor arrays (not shown).

The relationship rules also come into play if a consolidated event signal (based on a predetermined number of sensors in the array of sensors 202 firing off event signals) is to be transmitted, via a gateway 216 and a transit network 218 (e.g., a local IP-based or similar network), to a server 220. The server 220 can function as a remote controller for central controlling of emergent information. This control may include the creation and/or utilization of patterns (both database as well as graphic).

Emergent information logic (either software or hardware) is also part of each sensor. That is, each sensor may be able to consolidate event triggers from all sensors in the array of sensors 202, in order to generate emergent information that describes conditions about the array location 204. Thus, in the example described above, each sensor may be able determine that, based on event triggers caused by stormy weather (signaled by weather sensor 206), an audio signature of a cigarette boat (from audio sensor 214), and fast movement of the cigarette boat from a known drug-offloading location (from radar 212), a drug smuggling operation is likely in effect. Response to this may be local (e.g., turning on floodlights (not shown) in the array location 204) or remote (e.g., notifying a local law enforcement agency of the event).

As noted above, in a preferred embodiment, generation of emergent information is performed by the sensors themselves, thus being faster and less prone to communication failures. However, in an alternate embodiment, event signals (responsive to trigger rules being met) may be sent to a central controlling and emergent information pattern generating server 220. This server 220 can display details of the event signals on a display 222, or a consolidation of the event signals can be displayed as emergent information on a display 224. Computer 225 is the device on which the user can create the data pattern (e.g., pattern 802 shown below in FIG. 8) representing the emergent information, utilizing a graphical interface and, as described in exemplary manner herein, a semantic network approach to the creation of the pattern 802.

Figure 3:
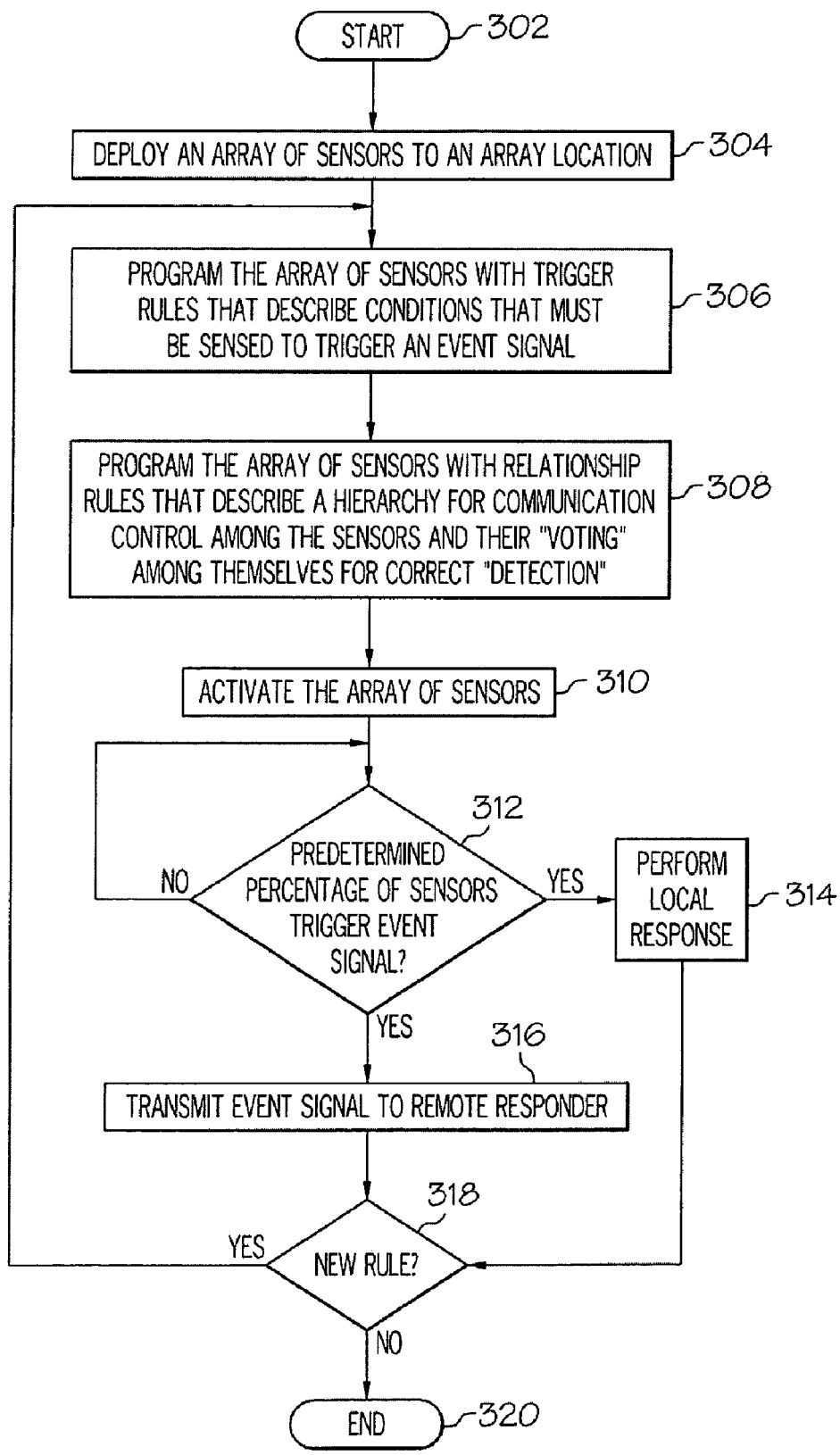
FIG. 3 is a flow-chart of exemplary steps taken to utilize emergent information that is created by an array of sensors.

With reference now to FIG. 3, a flow-chart of exemplary steps taken to utilize emergent information from a sensor field is presented. After initiator block 302, which may be prompted by a project to monitor field conditions, an array of sensors is deployed to an array location in the field (block 304). These sensors are programmed (either before or after deployment) with trigger rules (block 306) and relationship rules (block 308), which are described above. These rules may be pre-programmed before the sensors are deployed to the field, or they may be programmed by a remote controller as described above. Thus, as described in block 308, the array of sensors (e.g., an interlinked array of intelligent sensors) is programmed with relationship rules that describe a hierarchy for communication control among the sensors, and for "voting" among themselves in order to make a correct detection of an event.

After the array of sensors are activated (block 310), a query is made to determine if a predetermined percentage of the sensors have triggered an event signal (query block 312). If so, this creates emergent information that describes an overall picture of conditions at the array location. Preferably, the array of sensors use their consolidated logic to perform a local response (block 314), which addresses/corrects the perceived conditions at the array location. Note that in one embodiment, this local response is to turn a sensor on. Thus, to conserve battery life, a particular sensor may be turned on only if another sensor detects a condition in which the particular sensor is needed. In the example described above for drug interdiction (FIG. 2), the CCTV camera 210 may be on "stand by" until radar 212 detects suspicious movement, thus saving power consumption by CCTV camera 210.

Alternatively, the consolidated response (emergent information) is sent to a remote responder (e.g., local law enforcement described in FIG. 2), as described in block 316. If a determination is made that a trigger rule or a relationship rule for one or more of the sensors needs to be updated (query block 318), this action is performed by the remote controller (or alternatively, by one of the sensors). The process ends at terminator block 320.

Note that the present invention utilizes a data pattern approach, rather than a process pattern approach. That is, FIG. 4 demonstrates the process pattern approach (exemplified by thin lines 402) as the approach of collecting data 404, which leads to one or more observations 406, which leads to conclusions 408 and/or actions 410 that are controlled by a decision maker. The present invention bypasses most of these steps by allowing data 404, which conforms to a known pattern, to automatically lead directly to an action 410, as represented by a data pattern approach that is depicted by the thicker lines 412. The observations 406, conclusion 408, and/ or action 410 thus lead to a decision 414, which, in the example of a smuggler, may be a decision to alert local law enforcement, increase waterway patrols, etc.

Figure 4:
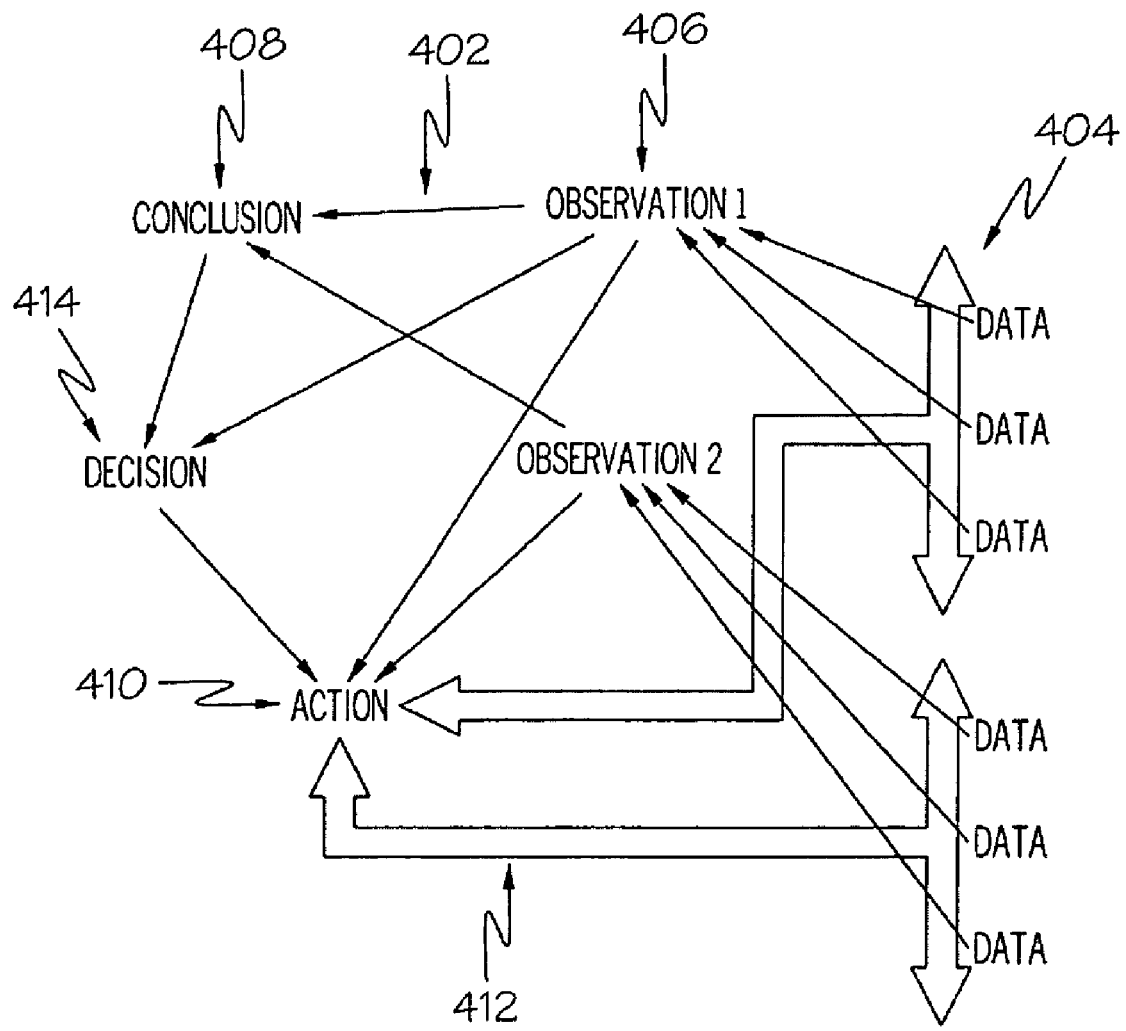
FIG. 4 illustrates a difference between process patterns and data patterns.
Figure 5:
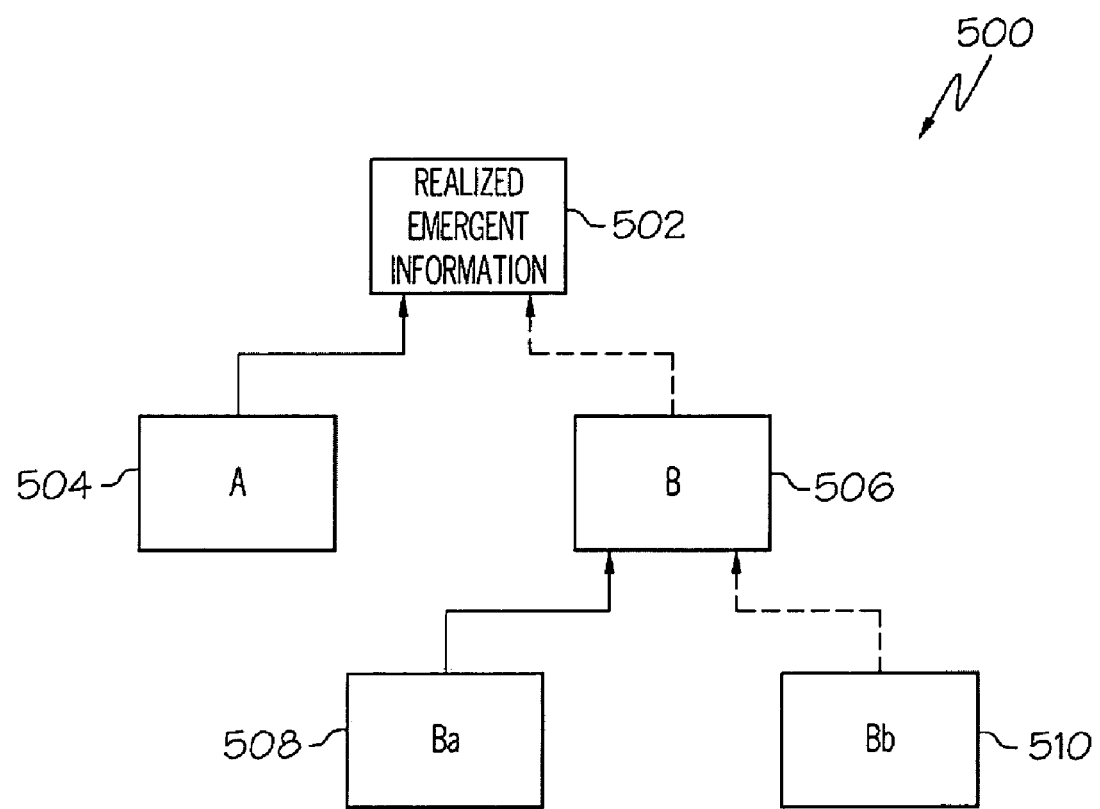
FIG. 5 depicts a relationship among pattern sub-components that produce realized emergent information.

With reference now to FIG. 5, the process depicted in FIG. 4 can also be conceptualized as a logic tree 500. That is, all of the steps taken in FIG. 4 are directed to creating a holistic view of events and sub-events, in order to develop and appreciate emergent information that is only understandable when all data is view together (rather than in piecemeal units). To reach this holistic view, new realized emergent information 502 is developed by Event A (504) and Event B (506). Note that the development of the realized emergent information 502 directly depends on Event A occurring. The development of the realized emergent information 502 also depends on Event B occurring, but only in a conditional manner. That is, Event B occurs only when Sub-event Ba (508) and Sub-event Bb (510) occur. Thus, Event B is a conditional event (as reflected by the dashed lines to and from Event B).

Emergent Information Database Management

A traditional database management system simply stores data. That is, data stored within such a system is without context, timing, and relevance. Even combinations of data lack context, relevance, and timing. Thus, to manage emergent information such as that described above, a unique system is used to collect, store, and manage emergent information which has context, relevance, usefulness, and has a time and place context. Such emergent information is stored and maintained in a unique Emergent Information Database Management System (EIDBMS). Note again that emergent information is based on a definition and storage of patterns of data which, when combined, collectively provide the user, either automated or human, with information which is not obvious until the combination or combinations of the data are considered in their entirety.

Note that while an EIDBMS is particularly useful when used with an array of sensors such as described above, an EIDBMS is also useful for interpreting existing databases. That is, while the EIDBMS can be utilized, in a manner described below, to create trigger rules, communication rules and consolidated logic for sensors as described above, the EIDBMS can also be used to create emergent information for an existing database.

As describe below, an EIDBMS changes the concept of information management from collecting, managing, and subsequently dealing with vast amounts of data, to collecting and managing information of relevance (leading to emergent information). Thus, emergent information is a combination of data which, when viewed by a human or intelligent software, conveys knowledge or insight that can only be ascertained when all, or in certain cases at least significant parts of the data comprising the emergent information, are viewed with each other and in the context of each other. Net "new" information is the result of viewing this combination. Thus, in the drug interdiction example shown above in FIG. 2, it is likely that one would not recognize that a drug smuggling operation is taking place by viewing data from only one of the sensors. However, by viewing data from multiple different types of sensors, the user is able to recognize that such an operation is likely, based on the pattern recognized by consolidating the event signals that have been triggered from multiple sensors.

Thus, emergent information is represented in the EIDBMS by patterns of data, either singular, or in certain combinations. A pattern, typically with one to several levels of data combined into a composite "map" or layout of the data, yields, when at least partially filled under specified conditions and rules, a recognition moment in which new information has been recognized, or "generated" by the pattern. Thus, emergent information is somewhat analogous to the physiology of human memory, in which groupings of protein memory bits stored in dendrites combine to represent memories according to these pattern combinations. An approximate computing analog to the brain pattern storage system is used in this inventive EIDBMS to achieve the same result.

Another analogy to the principals captured by the EIDBMS described herein is "wisdom," which is based on understanding principles. Principles represent the accumulation of patterns, typically in the case of this EIDBMS patterns of patterns that continue, when analyzed, to yield the same or semantically similar results over time. The inventive EIDBMS disclosed herein provides for the storage, continuous evaluation, and prioritization and self-ranking of stored patterns which could lead to eventual conclusions about the "wisdom" or accuracy of these patterns of patterns.

Thus the EIDBMS system provides for the federated, multi-dimensional, asynchronous, evaluated, autonomic, rules-driven, and managed storage of patterns of data that are either pre-defined, ad-hoc or self-generated.

The principals described here for creating and recreating emergent information may be applied to searching for intelligent life on other planets, diagnosing medical diseases, recognizing drug interactions, optimizing manufacturing processes, defining and correcting environmental issues, including global warming, establishing business and credit ratings and scores, etc. All scenarios include the use of self-generating patterns, which are created by a pattern of rules that create a new pattern when that pattern is invoked.

Figure 6:
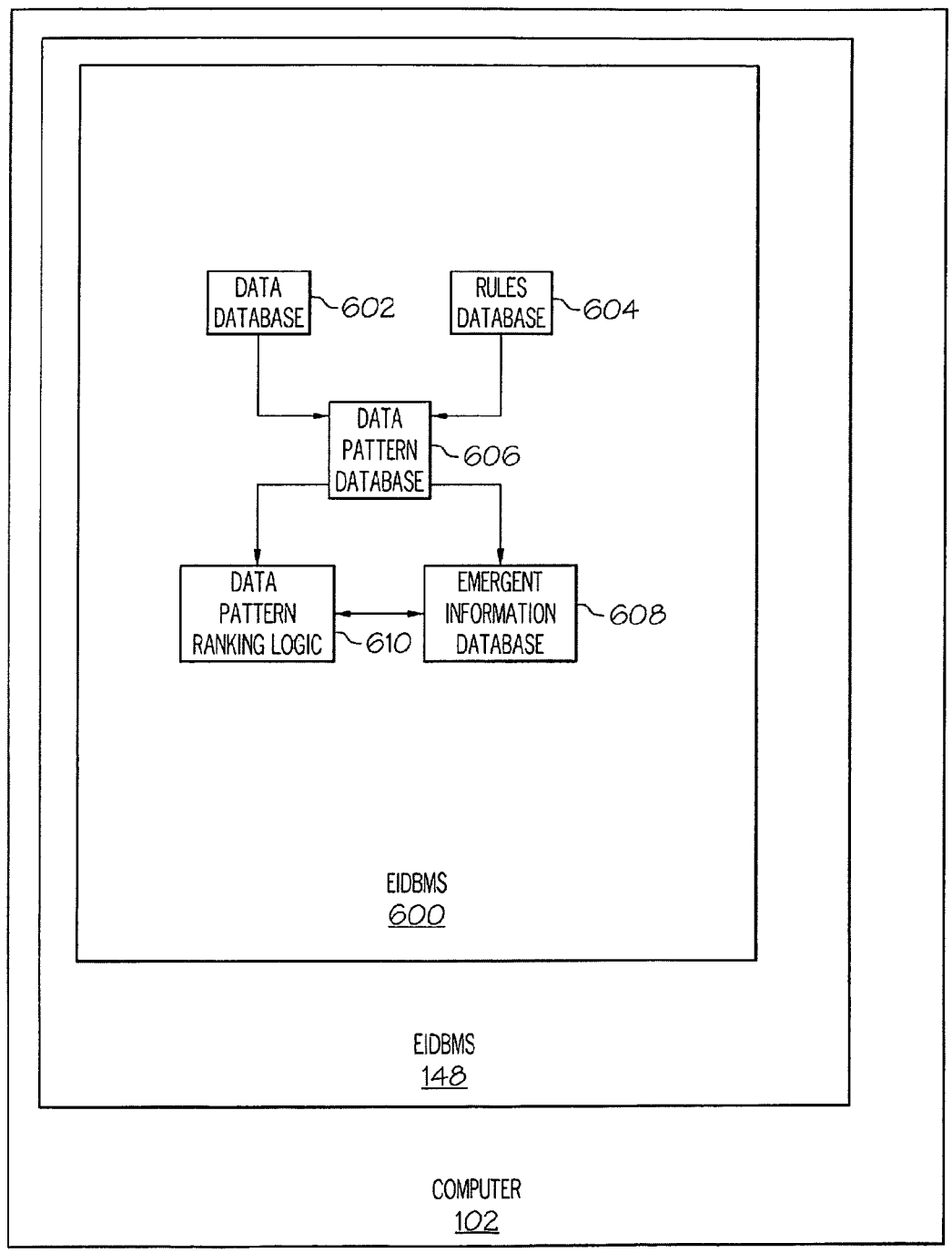
FIG. 6 depicts an exemplary Emergent Information Database Management System (EIDBMS) used to manage emergent data.

Referring now to FIG. 6, details of an Emergent Information Database Management System (EIDBMS) 600 are presented. EIDBMS 600 is part of a the EIDBPMS 148 in computer 102, described above in FIG. 1. EIDBMS 600 includes a data database 602 and a rules database 604. Rules from rules database 604 are applied to data in data database 602 to generate data patterns that are stored in data pattern database 606. For example, assume that there is a rule that states that whenever a radar system detects a marine vessel traveling from a specific location within a certain speed range, then underwater hydrophones must be turned on. These rules cause a consolidation of data from the radar system and the hydrophones to show a pattern of information whenever such a marine vessel is in the area of the sensors. The data patterns in the data pattern database 606 are then consolidated to create emergent information, which is stored in emergent information database 608. Thus, the data pattern from the radar and hydrophones generate emergent information such as "This is a smuggler." A data pattern ranking logic 610 is able to determine, based on historical information, which data patterns best describe (or predict) a particular emergent information. For example, assume that a smuggler is actually detected and/or caught 90% of the time that the radar and hydrophones turn on as described above, but a ship is found to be in distress only 50% of the time that the radar and hydrophones are turned On. In that scenario, if the radar and hydrophones are turned on and reporting data in the future, then it is more likely that there is smuggling activity occurring, rather than an innocent boat being in distress. Based on this historical data and ranking of data patterns, future incoming data can be quickly analyzed using such emergent information.

Figure 7:
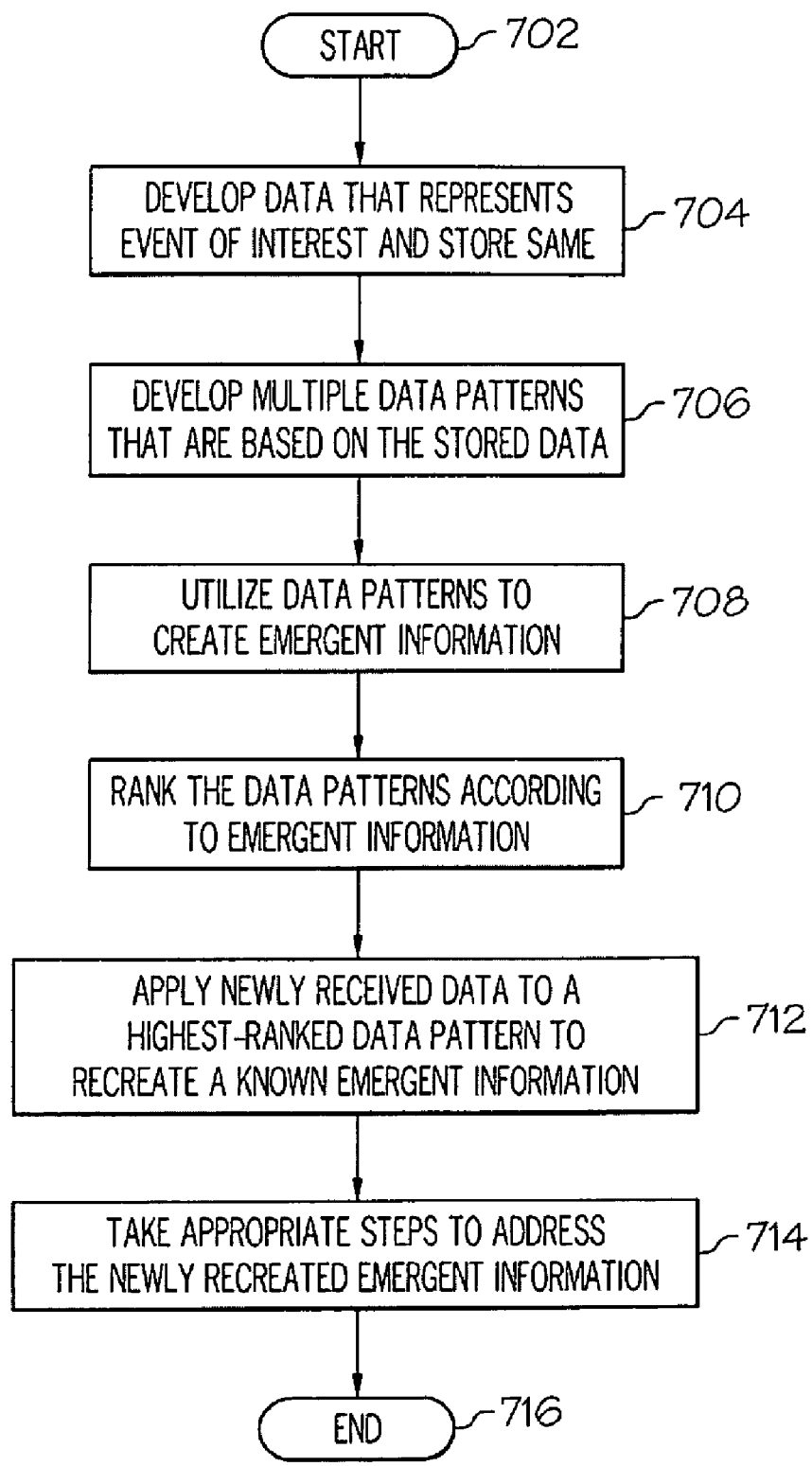
FIG. 7 is a flow-chart of exemplary steps taken to recreate known emergent information.

Thus, as shown in the flow chart of FIG. 7, assume that a new EIDBMS is being created (initiator block 702). As described in block 704, data (e.g., from sensors or even another database) is developed that represents some event of interest. This data is then stored in a data database. From this stored data, multiple data patterns are then stored in a data pattern database (block 706). These data patterns are then used to create emergent information (block 708), e.g., determining that smuggling is occurring based on data received from specific sensors. Various data patterns are then ranked according to how accurately they indicate (or predict) an emergent information (block 710). Thereafter, when new data is received that matches a known data pattern, that data pattern is ranked in accordance with a known emergent information (block 712). That is, assume that data comes in from a radar and hydrophone that has a particular value (i.e., "specific data") for the two sensors (i.e., "specific data types"). In the example above. (for smuggling and distress), the "smuggling" emergent information is more likely to be matched with the incoming data, and thus this data pattern is highest ranked as being the most likely correct pattern for recreating the known emergent information ("smuggling"). At that point, appropriate steps can be taken to apprehend the smugglers (block 714), such as notifying local law enforcement officials. The process ends at terminator block 716.

Note further that, in one embodiment, the EIDBMS 600 shown in FIG. 6 can be built using the "blob" feature of DB2™ (DB2 is a registered trademark of International Business Machines Corporation in the United States, other countries, or both), and other relational database software, along with newly defined schemas described herein. The Create Read Update Delete (CRUD) operations related to data patterns and emergent information can be provided as a service in a Service Oriented Architecture (SOA) as per the previously described pattern-driven sensor networks. Commercially available rules engines can be both outside and/or inside the new EIDBMS.

There are multiple advantages of the presently disclosed EIDBMS over the prior art. That is, prior art information systems (e.g., standard relational databases) are already generating more "information" than can be reasonably consumed by humans and traditional data processing systems, and this "glut" will only accelerate. For this "information" to be useful, timely and relevant, a fundamental change in how data and information is captured and analyzed is required. The EIDBMS addresses these and other issues by eliminating, or substantially reducing, the capture of "dead air" or irrelevant data, by the autonomous detection and storage of emergent information or information of real value, by providing a huge advance in the speed of realizing the appearance and relevance of emergent information, and by enabling the substantial advance of the ability of systems to run autonomously.

The present invention thus overcomes many deficiencies found in the prior art. These deficiencies included, but were not limited to, (a) the sensor, even if "smart," does not create any leverage or act as anything other than an event tripper. All analysis is performed in a central service, and (b) there are many single points of failure including, but not limited to: if a sensor fails, if the communication channel to the sensor is down, or if the data mining programs are too slow or not searching for the right combinations to match the latest variation of activity. If these sensors are used in law enforcement or military situations, for example, the people or objects of interest are constantly changing behaviors to avoid detection. If used in medicine, small variations person to person can cause basic observations to be inadequate or even lead to wrong conclusions.

The present invention, however, overcomes these deficiencies in the prior art by providing a robust, local intelligent network that is capable of autonomously detecting and correcting problems in the field, without waiting for direction from a remote controller logic. As described herein, this invention reverses the trend of using sensors that are fettered to a remote controller, and instead deploys pre-designed systems focused on the search for patterns in fields of different types of sensors based on pre-downloaded, likely combinations of data points or emergent information patterns. A point of departure for developing these search patterns to be downloaded into the sensor fields includes the patterns searched for after the data is all collected in the current approach. This is a sensor "grid" computing system, where the sensors themselves are smart, and interact with each other with a short-range communications protocol such as ZIGBEE™ (ZigBee is a registered trademark of the ZigBee Alliance in the United States and other countries). This constant intercommunication between sensors provides each sensor with a chance to constantly "vote" as to whether they have a known pattern they need to report, and note the pattern against several possible already downloaded patterns at once. There are many new patterns of search possible. Periodic reporting of a "no op" retains the network's confidence that it is still operating.

This new approach also creates a low power consumption profile for each sensor because they don't have to report "no op" all the time. Rather, each sensor in the field can take turns reporting for the whole field. This approach allows many network paths to get a report out when needed since each individual sensor, in a ZIGBEE™ type network, can be connected separately and report for all. This approach also provides for deterministic real time data processing, such that constant addition, deletion, and changes of patterns can be analyzed. Furthermore, some of the field sensors can be out (disabled, off-line, powered down, "asleep") and the overall field can still be successful, since in numbers there is built-in redundancy, and with patterns, the system can provide a tentative "yes" vote (for reporting an anomaly) with some predetermined percentage (e.g. two-thirds) of the sensors reporting information that conformed to a pre-defined anomaly pattern.

Pattern Generation

Figure 8:
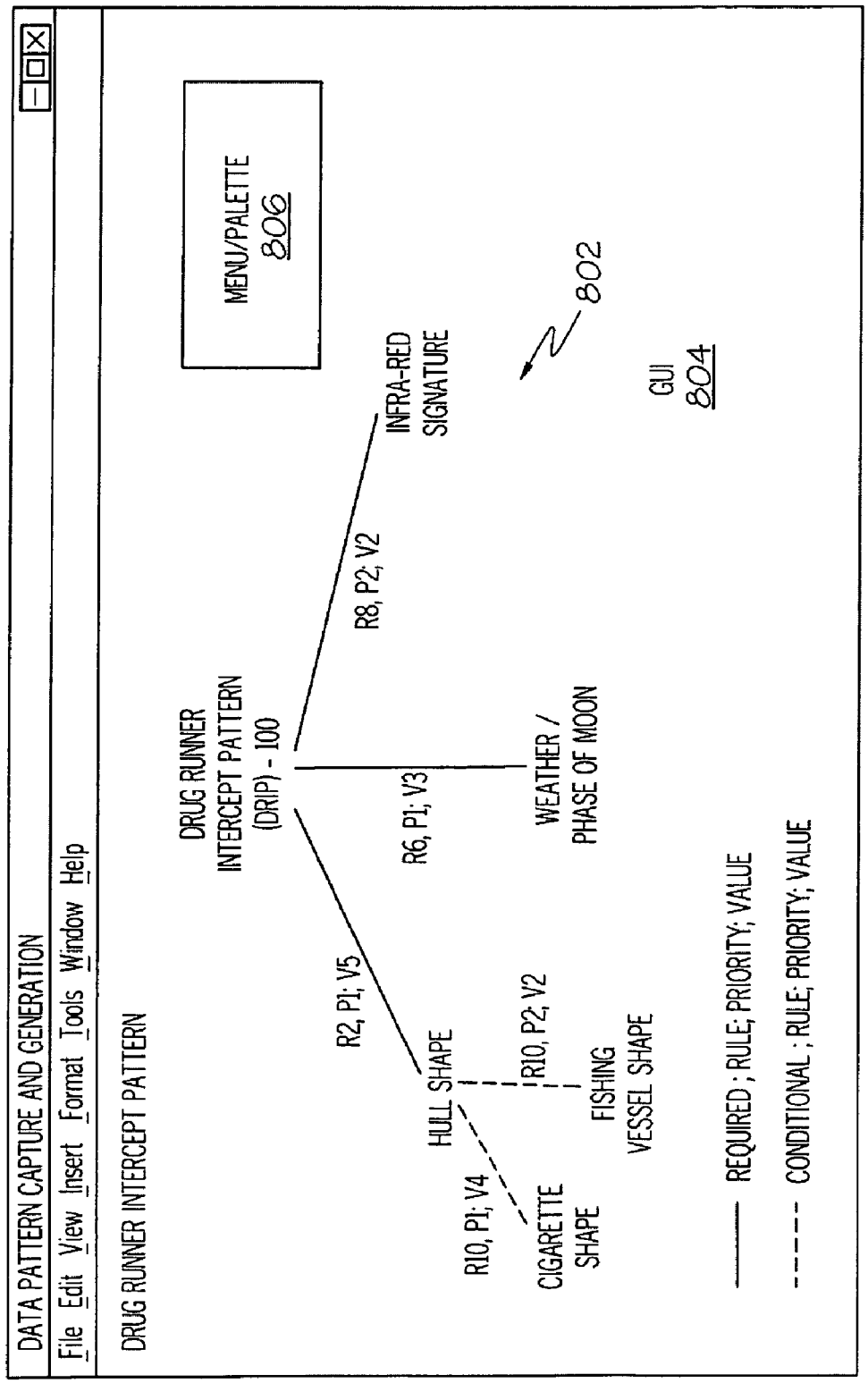
FIG. 8 depicts a Graphical User Interface (GUI) on which a controller/user has graphically created a pattern for an exemplary event.

In order to easily access and visualize emergent data, one embodiment of the present invention utilizes a novel method and system for data pattern generation and underlying data capture. An exemplary visual data pattern utilized by this novel method and system is shown in FIG. 8, which depicts an exemplary Drug Runner Intercept Pattern ("pattern 802") that a user/controller has created in a Graphical User Interface (GUI) 804. By drag-and-dropping (or otherwise selecting) different sub-events from a menu/palette 806, the user has created the depicted pattern "DRIP-100." For example, assume that the menu/palette 806 includes an option for an Infra-red signature (e.g., as captured by the thermal sensor 208 shown in FIG. 2 above) as being one of the events that make up a pattern that describes drug running. Assume also that there are multiple Rules, Priorities and Values that can be associated with the Infra-red signature. In the example shown, the Infra-red signature follows Rule 8 (R8), which may be that the Infra-red signature must be taken if the boat is traveling at more than 40 miles per hour. The Infra-red signature shown also has a Priority of 2 (P2), meaning that the Infra-red signature has a lower priority for describing a drug runner than the Weather/Phase of Moon, which has a priority of P1 (particularly if the Weather/Phase of Moon follows Rule 8 and matches Value V3, as shown in the exemplary pattern 802). Furthermore, the Infra-red signature should have a value of V2 (e.g., a heat signature that matches that of a high-powered diesel engine) in order to match the pattern 802 that describes a drug runner.

Note also that another of the events (conditions) is that the drug runner is using a boat with a hull shape that is defined by Rule 2 (R2), which may be that the drug runner is using a boat. This rule/condition has a top priority (P1) for describing a drug runner. This event/condition also must follow the value V5, which may indicate that the hull is capable of ocean-going operations. Note that the hull shape may be either that of a cigarette boat (value V4) or a fishing vessel (value V2). Each such hull shape is a conditional rule (condition) for describing the ocean-going vessel's hull. Note, however, that a vessel with a cigarette boat's hull has a higher priority (P1) for identifying a drug runner than a vessel with a fishing vessel's hull (P2).

The user is thus able to visually see the relationship of different events and their underlying rules, priorities and values that result in the emergent information describing a drug runner's profile. Note that each line, node and/or descriptor (Rule R, Priority P, Value V) may be examined by clicking such a line, node and/or descriptor, in order to give the user a more detailed understanding of what his choices for events/conditions, which make up the profile for a drug runner, entail.

Figure 9:
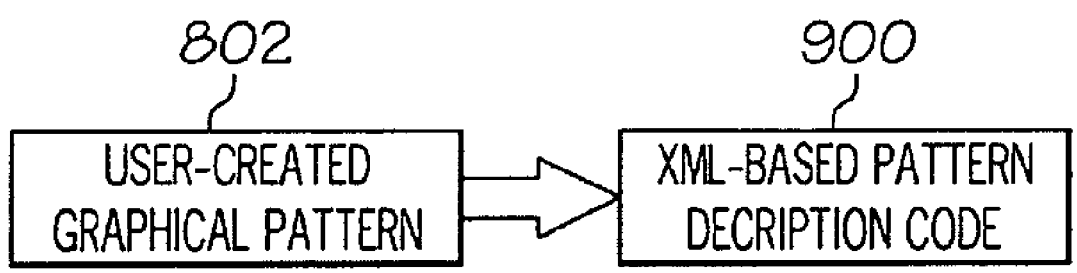
FIG. 9 illustrates a relationship between a user-created graphical pattern and an XML-based pattern description code.

As depicted in FIG. 9, the (user-created graphical) pattern 802 shown in FIG. 8 is used to auto-generate an XML-based pattern description code 900. That is, by using the rules, priorities and values for the events shown in the pattern 802, XML code can be auto-generated to create an XML file that describes (and contains "drill down" data for) the pattern 802. Consider then the detailed depiction of the XML-based pattern description code 900 shown in FIG. 10. Assume that a particular event/condition/node has two values: Data 1 and Data 2. A data characteristic block 1002 contains the actual values of Data 1 and Data 2, as well as any range of values that are acceptable for Data 1 and Data 2. Similarly, if there is a fence (event boundaries that limit conditions for the event data) or reference (location of the data for Data 1 and/or Data 2), these will also be described in data characteristic block 1002. A data type block 1004 in the XML file describes whether the data in Data 1 and/or Data 2 are numeric or alphanumeric. A Data 1 Rule Reference Characteristic 1006 and a Data 2 Rule Reference 1008 provide call logics, rules engine calls and adaptor calls that are used respectively by Data 1 Rule Reference 1010 and Data 2 Rule Reference 1012, which are reference rules needed to access the data that populates the respective blocks 1014 and 1016 for Data 1 and Data 2.

A Depends Rule Reference Characteristic 1018 describes the logic call, rules engine call and adapter call needed to fulfill the Depends Rule Reference 1020 that is used to create the Depends Reference 1022 (events on which the Data 1 and Data 2 depend). Similarly, a weighting factor 1024 gives a weight (how important they are) to the characteristics found in a Weighting Factor Rule Reference 1021 for the Depends Rule Reference Characteristic 1018. As Data 1 and Data 2 go through multiple iterations for different patterns, they interact with events that depend upon Data 1 and/or Data 2. These interactions are controlled by a Depends Upon Reference N 1026, a Depends Upon Rule Reference N 1028, a Weighting Factor Rule Reference 1030, a Depends Upon Rule Reference Characteristic 1032, a Weighting Factor 1034 and a Weighting Factor Rule Characteristic 1036 which are respectively similar to, and analogous in function to, Depends Reference 1022, Depends Rule Reference 1020, Weighting Factor Rule Reference 1021, Depends Rule Reference Characteristic 1018, and Weighting Factor 1024. Note that each sequence has a Weighting Factor Rule Characteristic 1036, which describes the call logic, rules engine call and/or adaptor call needed to access the weighting factors 1024 and/or 1034.

Figure 10:
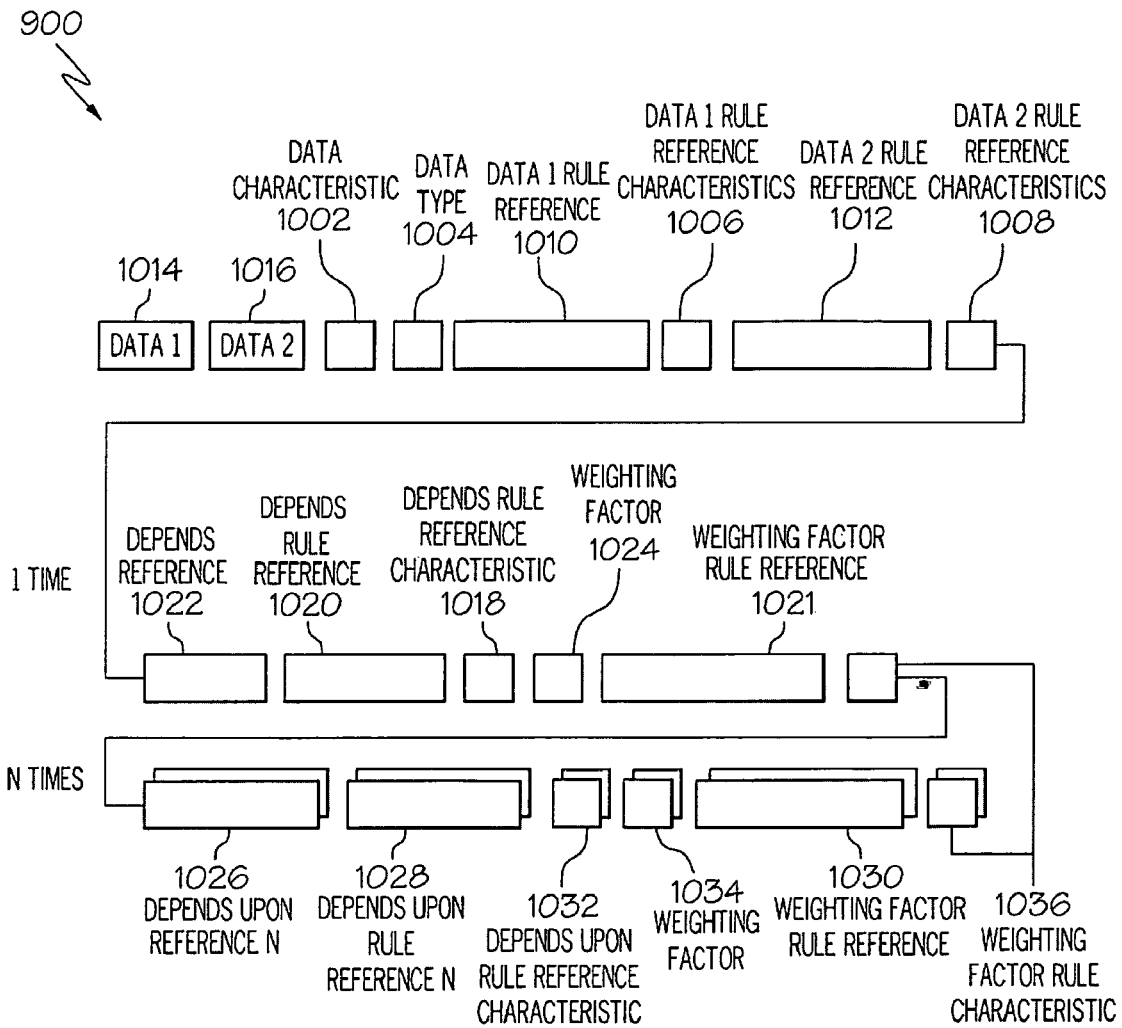
FIG. 10 depicts detail of the XML-based pattern description code shown in FIG. 9.

Thus, the XML-based pattern description code 900 shown in FIG. 10 provides for a rule-based, weighted, dependent data accessing system in which underlying data describes in detail the features of the pattern 802 from which they are derived. Thus, XML-based pattern description code 900 is an exemplary Extensible Markup Language (XML) schema for storing a data pattern that describes (e.g., provides underlying support data) the pattern 802 shown in FIG. 8.

Figure 11:
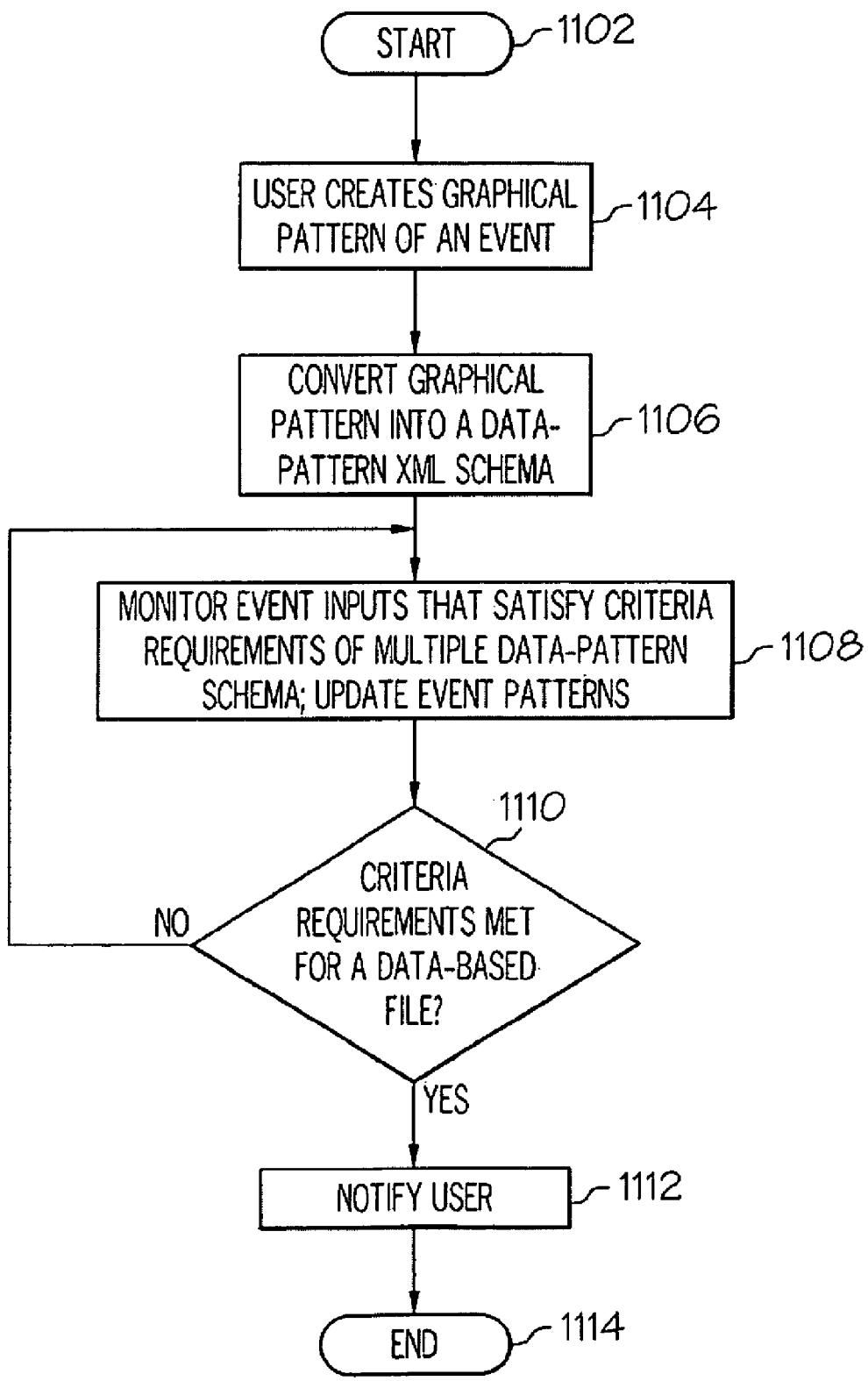
FIG. 11 is a high-level flow-chart of exemplary steps taken to create and utilize a graphical pattern of an event.

Referring now to FIG. 11, a high-level flow-chart of exemplary steps taken to generate and utilize a pattern that provides emergent information is presented. After initiator block 1102, a user generates a data pattern using the above-described inventive semantic network driven data pattern generation process (block 1104), in which the pattern is converted into a data-pattern XML schema (e.g., an XML-based data file), as described in block 1106. As described in block 1108, the pattern is then used to create a search in a parallel architecture search process. In one embodiment, each parallel search is enabled first by the deployment of a Service Oriented Architecture (SOA) service search agent to parallel processors, and then by the deployment of data patterns sent forward from the search SOA service. The search SOA service and the federated agents are all inter-connected via XML messaging schemas that are used for distributing the data patterns, as well as for inter-agent messaging and voting. All of the SOA search agents examine data via various means that include, for example, loading stored procedures in target databases that are resident in the forward deployed computing capabilities that are as far to the edge of the network as possible, and/or processing data at a socket as it comes off of a sensor or from an external system, etc. The SOA search agents each detect some or all of a data pattern, and then message each other and vote. Results are then sent to the search SOA service, and on to other elements of the inventive end-to-end data pattern driven architecture using the XML messaging schemas. Note that search data patterns are constantly updated, deleted, and added as required.

As depicted, in query block 1110, if an adequate number of the XML files have their criteria met, then the user is so notified (block 1112). For example, if inputs to the XML files reflect that a cigarette hull boat has a high heat signature during a moonless night (meeting criteria set by the user when creating the original textual pattern show in FIG. 8), then an alert is sent to the local law enforcement authorities. The process ends at terminator block 1114.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of EIDBPMS 148, are performed by service provider server 150. Alternatively, EIDBPMS 148 and the method described herein, and in particular as shown and described in FIGS. 2-11, can be deployed as a process software from service provider server 150 to computer 102. Still more particularly, process software for the method so described may be deployed to service provider server 150 by another service provider server (not shown).

Figure 12A:
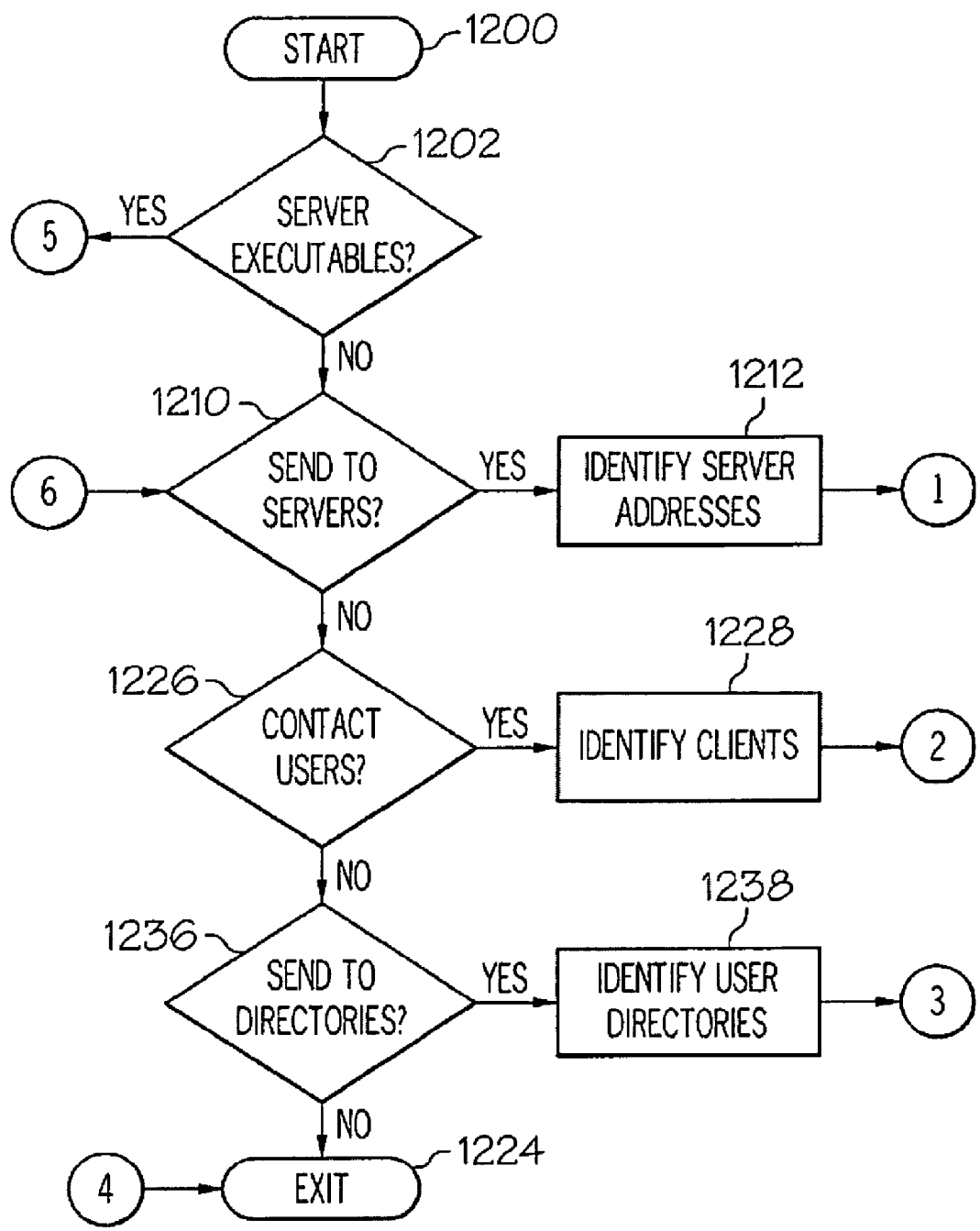
FIGS. 12A-B are flow-charts showing steps taken to deploy software capable of executing the steps described in FIGS. 2-11.
Figure 12B:
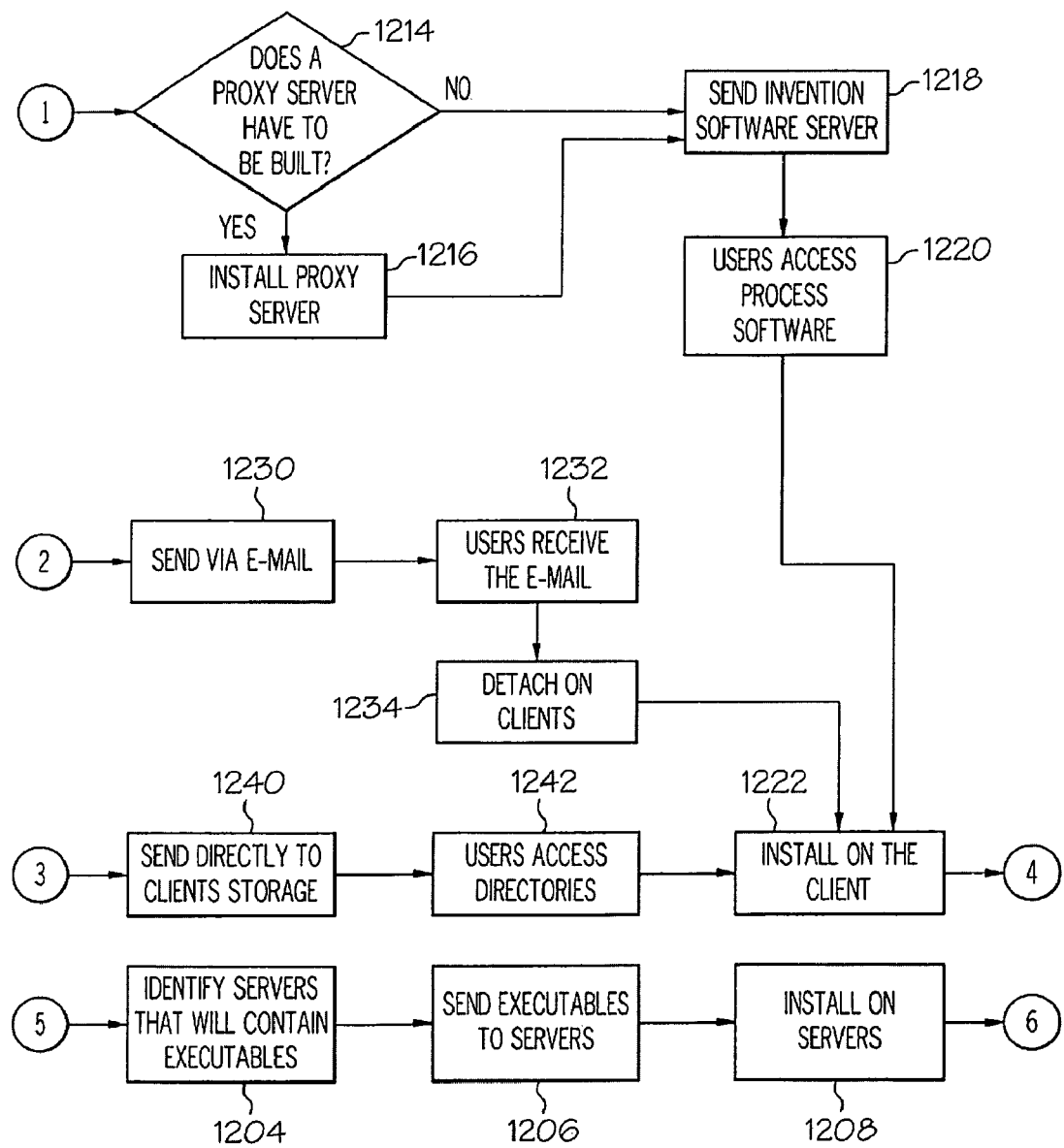

Referring then to FIGS. 12A-B, step 1200 begins the deployment of the process software. The first thing is to determine if there are any programs that will reside on a server or servers when the process software is executed (query block 1202). If this is the case, then the servers that will contain the executables are identified (block 1204). The process software for the server or servers is transferred directly to the servers' storage via File Transfer Protocol (FTP) or some other protocol or by copying though the use of a shared file system (block 1206). The process software is then installed on the servers (block 1208).

Next, a determination is made on whether the process software is to be deployed by having users access the process software on a server or servers (query block 1210). If the users are to access the process software on servers, then the server addresses that will store the process software are identified (block 1212).

A determination is made if a proxy server is to be built (query block 1214) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 1216). The process software is sent to the servers either via a protocol such as FTP or it is copied directly from the source files to the server files via file sharing (block 1218). Another embodiment would be to send a transaction to the servers that contained the process software and have the server process the transaction, then receive and copy the process software to the server's file system. Once the process software is stored at the servers, the users, via their computers, then access the process software on the servers and copy to their computers file systems (block 1220). Another embodiment is to have the servers automatically copy the process software to each client and then run the installation program for the process software at each computer. The user executes the program that installs the process software on his computer (block 1222) then exits the process (terminator block 1224).

In query step 1226, a determination is made whether the process software is to be deployed by sending the process software to users via e-mail. The set of users where the process software will be deployed are identified together with the addresses of the user computers (block 1228). The process software is sent via e-mail to each of the users' computers (block 1230). The users then receive the e-mail (block 1232) and then detach the process software from the e-mail to a directory on their computers (block 1234). The user executes the program that installs the process software on his computer (block 1222) then exits the process (terminator block 1224).

Lastly a determination is made as to whether the process software will be sent directly to user directories on their computers (query block 1236). If so, the user directories are identified (block 1238). The process software is transferred directly to the user's computer directory (block 1240). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 1242). The user executes the program that installs the process software on his computer (block 1222) and then exits the process (terminator block 1224).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 13A:
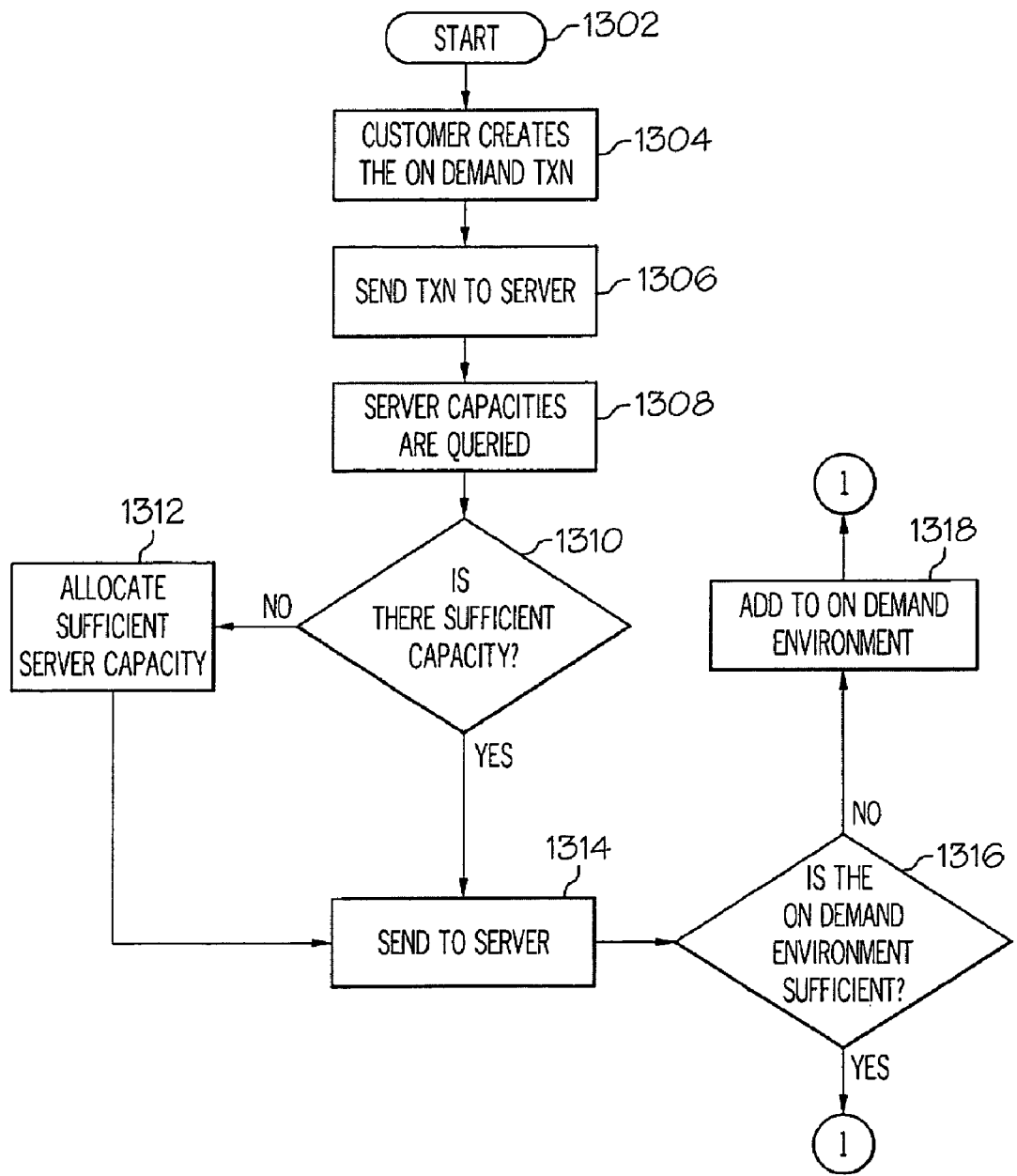
FIGS. 13A-B are flow-charts showing steps taken to execute the steps shown in FIGS. 2-11 using an on-demand service provider.
Figure 13B:
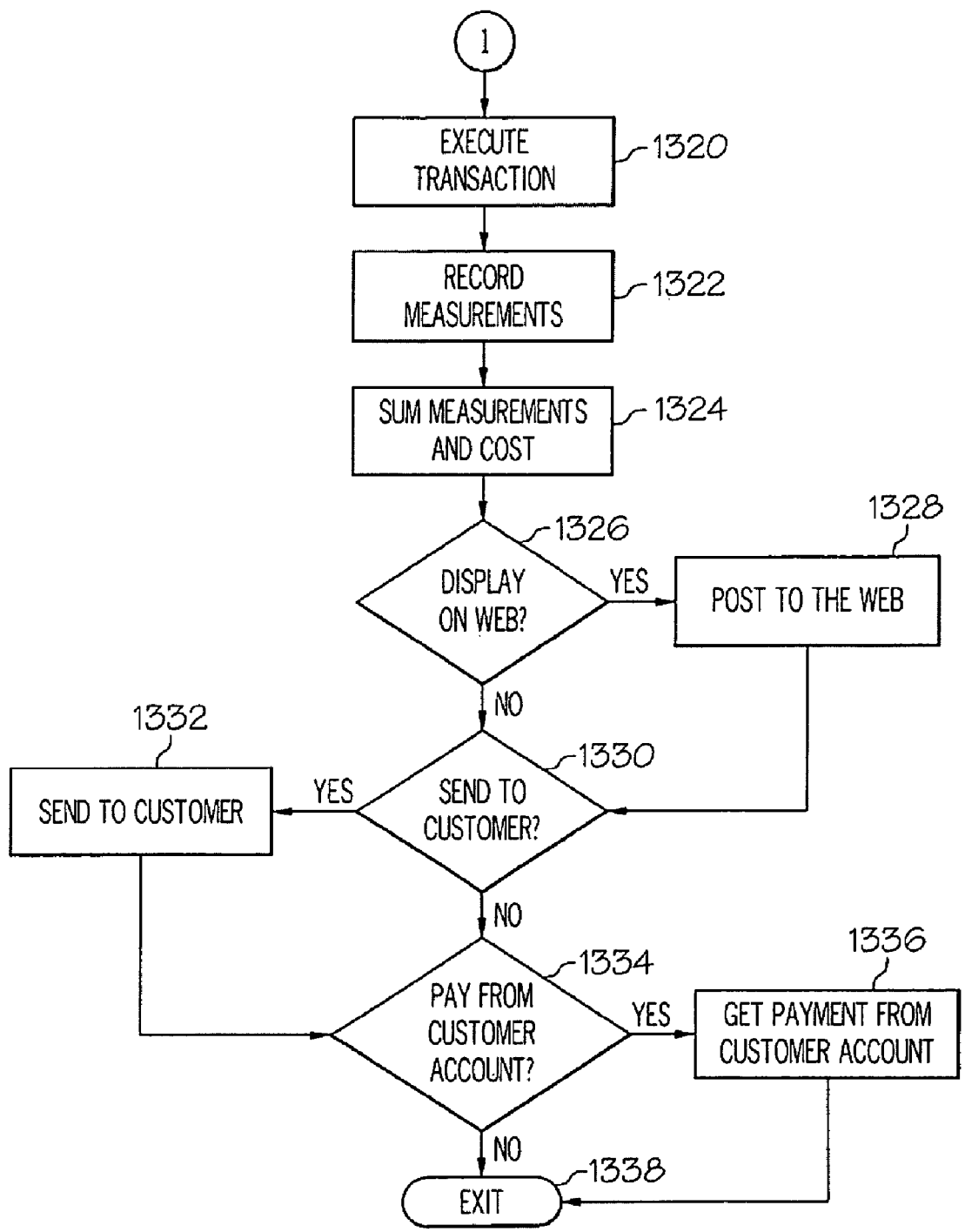

With reference now to FIGS. 13A-B, initiator block 1302 begins the On Demand process. A transaction is created than contains the unique customer identification, the requested service type and any service parameters that further specify the type of service (block 1304). The transaction is then sent to the main server (block 1306). In an On Demand environment the main server can initially be the only server, then as capacity is consumed other servers are added to the On Demand environment.

The server central processing unit (CPU) capacities in the On Demand environment are queried (block 1308). The CPU requirement of the transaction is estimated, then the server's available CPU capacity in the On Demand environment are compared to the transaction CPU requirement to see if there is sufficient CPU available capacity in any server to process the transaction (query block 1310). If there is not sufficient server CPU available capacity, then additional server CPU capacity is allocated to process the transaction (block 1312). If there was already sufficient available CPU capacity then the transaction is sent to a selected server (block 1314).

Before executing the transaction, a check is made of the remaining On Demand environment to determine if the environment has sufficient available capacity for processing the transaction. This environment capacity consists of such things as but not limited to network bandwidth, processor memory, storage etc. (block 1316). If there is not sufficient available capacity, then capacity will be added to the On Demand environment (block 1318). Next the required software to process the transaction is accessed, loaded into memory, then the transaction is executed (block 1320).

The usage measurements are recorded (block 1322). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1324).

If the customer has requested that the On Demand costs be posted to a web site (query block 1326), then they are posted (block 1328). If the customer has requested that the On Demand costs be sent via e-mail to a customer address (query block 1330), then these costs are sent to the customer (block 1332). If the customer has requested that the On Demand costs be paid directly from a customer account (query block 1334), then payment is received directly from the customer account (block 1336). The On Demand process is then exited at terminator block 1338.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of utilizing emergent information, the method comprising:

presenting a plurality of pattern components to a user, wherein pattern components from the plurality of pattern components are utilized by the user to create a customized graphical event pattern on a Graphical User Interface (GUI), and wherein the customized graphical event pattern represents emergent information that describes an event;

receiving the customized graphical event pattern from the user;

transmitting data representing the customized graphical event pattern to an interlinked array of intelligent sensors at an array location, wherein the interlinked array of intelligent sensors exchange a set of event data inputs among intelligent sensors within the interlinked array of intelligent sensors, and wherein event data inputs are generated using observations made by the intelligent sensors in the interlinked array of intelligent sensors;

determining, by the interlinked array of intelligent sensors, if the set of event data inputs meets a predetermined threshold requirement for one or more of the pattern components, wherein multiple intelligent sensors in the interlinked array of intelligent sensors vote to determine if the predetermined threshold requirement has been met; and in response to the multiple sensors voting that the set of event data inputs meets the predetermined threshold for one or more of the pattern components, transmitting a notification signal alert to the user.

2. The method of claim 1, further comprising:

generating data patterns that each describe a different customized graphical event pattern;

ranking multiple data patterns according to each data pattern's historic accuracy in creating a known emergent information;

applying newly received data to a highest-ranked data pattern to revise the known emergent information; and performing a response to address revised emergent information.

3. The method of claim 2, wherein the known emergent information is initially created by:

programming each intelligent sensor in the interlinked array of intelligent sensors with a trigger rule, wherein the trigger rule describes a local condition that must be met for the intelligent sensor to trigger an event signal;

programming each intelligent sensor in the interlinked array of intelligent sensors with a relationship rule, wherein the relationship rule describes a hierarchy of communication control among intelligent sensors in the interlinked array of intelligent sensors;

activating the interlinked array of intelligent sensors; and in response to conditions at the array location causing a predetermined percentage of intelligent sensors, from the interlinked array of intelligent sensors, to trigger event signals, generating emergent information about the array location, wherein the emergent information describes conditions at the array location, and wherein the emergent information exists only when the predetermined percentage of intelligent sensors trigger event signals.

4. The method of claim 3, wherein the array location is on a barrier, and wherein the interlinked array of intelligent sensors comprises a weather sensor, a thermal sensor, a video camera, a radar system, and an audio sensor.

5. The method of claim 4, wherein the barrier is a physical coastline.

6. The method of claim 4, wherein the barrier is a virtual barrier described in software to describe an operational boundary of the interlinked array of intelligent sensors.

7. The method of claim 2, wherein the response to address the revised emergent information is performed by a local controller at the array location using a consolidation of trigger rules from the interlinked array of intelligent sensors.

8. The method of claim 3, wherein the relationship rule defines how each intelligent sensor, in the interlinked array of intelligent sensors, communicates with other intelligent sensors in the interlinked array of intelligent sensors.

9. The method of claim 3, further comprising:
updating, from a remote controller, the trigger rule and the relationship rule in each intelligent sensor in the interlinked array of intelligent sensors.

10. The method of claim 3, wherein each intelligent sensor in the interlinked array of intelligent sensors comprises multiple different trigger rules to be used in a creation of different emergent information.

11. A system comprising:
a processor;
a data bus coupled to the processor;
a memory coupled to the data bus; and
a computer-usable medium embodying computer program code, the computer program code comprising instructions executable by the processor and configured for utilizing emergent information by performing the steps of:
presenting a plurality of pattern components to a user, wherein pattern components from the plurality of pattern components are utilized by the user to create a customized graphical event pattern on a Graphical User Interface (GUI), and wherein the customized graphical event pattern represents emergent information that describes an event;
receiving the customized graphical event pattern from the user;
transmitting data representing the customized graphical event pattern to an interlinked array of intelligent sensors at an array location, wherein the interlinked array of intelligent sensors exchange a set of event data inputs among intelligent sensors within the interlinked array of intelligent sensors, and wherein event data inputs are generated using observations made by the intelligent sensors in the interlinked array of intelligent sensors;
determining, by the interlinked array of intelligent sensors, if the set of event data inputs meets a predetermined threshold requirement for one or more of the pattern components, wherein multiple intelligent sensors in the interlinked array of intelligent sensors vote to determine if the predetermined threshold requirement has been met; and
in response to the multiple sensors voting that the set of event data inputs meets the predetermined threshold for one or more of the pattern components, transmitting a notification signal alert to the user.

12. The system of claim 11, wherein the interlinked array of intelligent sensors comprises a weather sensor, a thermal sensor, a video camera, a radar system, and an audio sensor.

13. A computer-readable medium embodying computer program code, the computer program code comprising instructions executable by the processor and configured for utilizing emergent information by performing the steps of:
presenting a plurality of pattern components to a user, wherein pattern components from the plurality of pattern components are utilized by the user to create a customized graphical event pattern on a Graphical User Interface (GUI), and wherein the customized graphical event pattern represents emergent information that describes an event;
receiving the customized graphical event pattern from the user;
transmitting data representing the customized graphical event pattern to an interlinked array of intelligent sensors at an array location, wherein the interlinked array of intelligent sensors exchange a set of event data inputs among intelligent sensors within the interlinked array of intelligent sensors, and wherein event data inputs are generated using observations made by the intelligent sensors in the interlinked array of intelligent sensors;
determining, by the interlinked array of intelligent sensors, if the set of event data inputs meets a predetermined threshold requirement for one or more of the pattern components, wherein multiple intelligent sensors in the interlinked array of intelligent sensors vote to determine if the predetermined threshold requirement has been met; and
in response to the multiple sensors voting that the set of event data inputs meets the predetermined threshold for one or more of the pattern components, transmitting a notification signal alert to the user.

14. The computer-readable medium of claim 13, wherein the instructions are further configured for:
generating data patterns that each describe a different customized graphical event pattern;
ranking multiple data patterns according to each data pattern's historic accuracy in creating a known emergent information;
applying newly received data to a highest-ranked data pattern to revise the known emergent information; and
performing a response to address revised emergent information.

15. The computer-readable medium of claim 14, wherein the known emergent information is initially created by:
programming each intelligent sensor in the interlinked array of intelligent sensors with a trigger rule, wherein the trigger rule describes a local condition that must be met for the intelligent sensor to trigger an event signal;
programming each intelligent sensor in the interlinked array of intelligent sensors with a relationship rule, wherein the relationship rule describes a hierarchy of communication control among intelligent sensors in the interlinked array of intelligent sensors;
activating the interlinked array of intelligent sensors to enable communication among the intelligent sensors; and
in response to conditions at the array location causing a predetermined percentage of intelligent sensors, from the interlinked array of intelligent sensors, to trigger event signals, generating emergent information about the array location, wherein the emergent information describes conditions at the array location, and wherein the emergent information exists only when the predetermined percentage of intelligent sensors trigger event signals.

16. The computer-readable medium of claim 15, wherein the array location is on a water coastline, and wherein the interlinked array of intelligent sensors comprises a weather sensor, a thermal sensor, a video camera, a radar system, and an audio sensor.

17. The computer readable medium of claim 15, wherein the relationship rule defines how each intelligent sensor, in the interlinked array of intelligent sensors, communicates with other intelligent sensors in the interlinked array of intelligent sensors.

18. The computer-readable medium of claim 14, wherein the response to address the revised emergent information is performed by a local controller at the array location using a consolidation of trigger rules from the interlinked array of intelligent sensors.

19. The computer-readable medium of claim 13, wherein the computer-usable medium is a component of a remote server, and wherein the computer executable instructions are deployed to a supervisory computer from the remote server.

20. The computer-readable medium of claim 13, wherein the computer executable instructions are provided by a service provider to a customer on an on-demand basis.

* * * * *